US008942912B2

(12) United States Patent
Wang et al.

(10) Patent No.: US 8,942,912 B2
(45) Date of Patent: Jan. 27, 2015

(54) ENGINE-OUT NOX VIRTUAL SENSOR USING CYLINDER PRESSURE SENSOR

(71) Applicant: GM Global Technology Operations LLC, Detroit, MI (US)

(72) Inventors: Yue-Yun Wang, Troy, MI (US); Yongshen He, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 303 days.

(21) Appl. No.: 13/627,932

(22) Filed: Sep. 26, 2012

(65) Prior Publication Data

US 2013/0024089 A1 Jan. 24, 2013

Related U.S. Application Data

(63) Continuation-in-part of application No. 12/245,828, filed on Oct. 6, 2008, now Pat. No. 8,301,356.

(51) Int. Cl.

| | |
|---|---|
| ***B60T 7/12*** | (2006.01) |
| ***F02D 35/02*** | (2006.01) |
| ***F02D 41/14*** | (2006.01) |
| *F02D 41/28* | (2006.01) |

(52) U.S. Cl.

CPC .......... *F02D 35/023* (2013.01); *F02D 41/1462* (2013.01); *F02D 35/026* (2013.01); *F02D 41/1405* (2013.01); *F02D 35/028* (2013.01); *F02D 2041/288* (2013.01); *F01N 2900/1402* (2013.01)

USPC .......................................... 701/109; 123/703

(58) Field of Classification Search

CPC . B60W 10/06; F01D 41/1456; F01D 41/1458

USPC .................. 701/102, 109, 115; 123/434, 703; 60/276, 277, 275, 286; 73/114.16, 73/114.17

See application file for complete search history.

(56) References Cited

U.S. PATENT DOCUMENTS

| | | | | |
|---|---|---|---|---|
| 8,091,416 | B2 * | 1/2012 | Wang et al. | 73/114.75 |
| 8,186,151 | B2 * | 5/2012 | Viola et al. | 60/295 |
| 8,201,444 | B2 * | 6/2012 | Wang et al. | 73/114.75 |
| 8,245,567 | B2 * | 8/2012 | Wang et al. | 73/114.75 |
| 8,301,356 | B2 * | 10/2012 | Wang et al. | 701/102 |
| 8,424,289 | B2 * | 4/2013 | Narayanaswamy et al. | 60/285 |
| 2010/0186390 | A1 * | 7/2010 | Perry et al. | 60/295 |

* cited by examiner

*Primary Examiner* — John Kwon

(57) ABSTRACT

Method for estimating NOx creation in a combustion process of an engine including a variable volume combustion chamber includes monitoring engine sensor inputs including a cylinder pressure within the combustion chamber. A mass fraction burn value for combustion can be modeled within the combustion chamber based upon said sensor inputs, wherein said mass fraction burn value indexes a crank angle at which a selected percentage of injected fuel is burned in a combustion cycle. The state of combustion within the combustion chamber can be estimated based upon the mass fraction burn value, the state of combustion including a combustion phasing and a combustion strength. NOx creation within the combustion chamber can be estimated with a non-linear function based upon said state of combustion.

19 Claims, 8 Drawing Sheets

ENGINE-OUT NOX VIRTUAL SENSOR USING CYLINDER PRESSURE SENSOR

CROSS REFERENCE TO RELATED APPLICATIONS

This is a continuation-in-part application of U.S. application Ser. No. 12/245,828, filed on Oct. 6, 2008, which is incorporated herein by reference.

TECHNICAL FIELD

This disclosure is related to control of aftertreatment of NOx emissions in internal combustion engines.

BACKGROUND

The statements in this section merely provide background information related to the present disclosure. Accordingly, such statements are not intended to constitute an admission of prior art.

Emissions control is an important factor in engine design and engine control. One particular combustion by-product, NOx, is created by nitrogen and oxygen molecules present in engine intake air disassociating in the high temperatures of combustion. Rates of NOx creation include known relationships to the combustion process, for example, with higher rates of NOx creation being associated with higher combustion temperatures and longer exposure of air molecules to the higher temperatures. Reduction of NOx created in the combustion process and management of NOx in an exhaust aftertreatment system are priorities in vehicle design.

NOx molecules, once created in the combustion chamber, can be converted back into nitrogen and oxygen molecules in exemplary devices known in the art within the broader category of aftertreatment devices. However, one having ordinary skill in the art will appreciate that aftertreatment devices are largely dependent upon operating conditions, such as device operating temperature driven by exhaust gas flow temperatures.

Modern engine control methods utilize diverse operating strategies to optimize combustion. Some operating strategies, optimizing combustion in terms of fuel efficiency, include lean, localized, or stratified combustion within the combustion chamber in order to reduce the fuel charge necessary to achieve the work output required of the cylinder. While temperatures in the combustion chamber can get high enough in pockets of combustion to create significant quantities of NOx, the overall energy output of the combustion chamber, in particular, the heat energy expelled from the engine through the exhaust gas flow, can be greatly reduced from normal values. Such conditions can be challenging to exhaust aftertreatment strategies, since, as aforementioned, aftertreatment devices frequently require an elevated operating temperature, driven by the exhaust gas flow temperature, to operate adequately to treat NOx emissions.

Aftertreatment devices are known, for instance, utilizing catalysts capable of storing some amount of NOx, and engine control technologies have been developed to combine these NOx traps or NOx adsorbers with fuel efficient engine control strategies to improve fuel efficiency and still achieve acceptable levels of NOx emissions. One exemplary strategy includes using a NOx trap to store NOx emissions during fuel lean operations and then purging the stored NOx during fuel rich, higher temperature engine operating conditions with conventional three-way catalysis to nitrogen and water. Such purging events or regeneration events can be the result of changing vehicle operation or forced purging events. A forced purging event requires monitoring the amount of NOx stored and some mechanism or criteria to initiate the purge. For example, a NOx trap has a limited storage capacity, and sensors can be used in the exhaust gas flow to estimate NOx creation in order to estimate the NOx trap state. Once the NOx trap gets close to its full capacity, it must be regenerated with a fuel rich reducing “pulse”. It is desirable to control the efficiency of the regeneration event of the NOx trap to provide optimum emission control and minimum fuel consumption. Various strategies have been proposed.

Techniques are known for adsorbing NOx (trapping) when the air-fuel ratio of the exhaust gas flowing into the NOx adsorbent is lean and releasing the adsorbed NOx (regenerating) when the air-fuel ratio of the exhaust gas flowing into the NOx adsorbent becomes rich wherein the amount of NOx adsorbed in the NOx adsorbent may be estimated from the engine load and the engine rotational speed. When the amount of the estimated NOx becomes the maximum NOx adsorption capacity of the NOx adsorbent, the air-fuel ratio of the exhaust gas flowing into the NOx adsorbent is made rich. Determination of a regeneration phase may also be on the basis of individual operating cycles of the internal combustion engine.

It is also known to estimate how full the NOx trap is by estimating the amount of NOx flowing into the NOx trap using a NOx sensor or a pre-NOx trap oxygen sensor. It is also known to schedule regeneration based on estimations of accumulated NOx mass and engine load and speed operating condition probabilities.

Increasingly stringent emission standards require NOx aftertreatment methods, utilizing, for example, a selective catalytic reduction device (SCR). An SCR utilizes ammonia derived from urea injection or recovered from normal operation of a three-way catalyst device to treat NOx. Continued improvement in exhaust aftertreatment requires accurate information regarding NOx emissions in the exhaust gas flow in order to achieve effective NOx reduction, such as dosing proper amount of urea based on monitored NOx emissions.

A NOx sensor or an oxygen sensor add cost and weight to a vehicle, and such sensors frequently require a particular operating temperature range, achieved after some warm-up time, to be functional. There exist methods to estimate engine-out NOx via detailed combustion modeling using heat release model, multi-zone combustion model and Zodovich chemical kinetic equations. This detailed modeling, although good for analysis, may not be appropriate for in-vehicle engine control module (ECM) applications because of complicated programming and calibration requirements. Additionally, such models are sensitive to sensor tolerance and aging, pose a large computational burden upon the ECM, and require processing time not providing results in real-time.

A combustion model predicting NOx creation from combustion parameters must take into account all of the variable parameters that may occur within a vehicle. While it might be possible for a technician to individually analyze and design a custom algorithm for each vehicle and periodically tune the algorithm to changing system and operating conditions, it would be unwieldy to perform such operations on a wide spread basis. It is instead preferable that some automatic control monitors the system and adjusts parameters of the control algorithm on the basis of the performance of the specific system. Machine learning algorithms have been developed to allow automated adjustment of functional mechanisms on the basis of changing conditions and results. A number of different machine learning algorithm techniques have become widely explored; one of particular application to the present disclosure includes a neural network.

Neural networks are well known in the art and will not be described in detail herein. However, as is most relevant to this disclosure, artificial neural networks or neural networks are computer systems created to emulate biological means of decision making. Whereas traditional computing means are based upon sequential processing of data through an algorithm yielding predictable results, neural networks are known to process data in consecutive layers and parallel paths within each layer through alternate nodes. The neural network is initially trained with data yielding a known set of results. As a result of this training, weights are applied between the layers and among the nodes, the network automatically adapting to the training data and adjusting the weights to more closely model the data. In later use, the neural network can retain the training adjustments and apply them through the life of the network, or the network can employ various known methods to learn from ongoing data patterns. Neural networks have the benefit of being adaptive to complex data sets and changing conditions. Whereas traditional algorithms must be programmed with a fixed functional process, attempting to anticipate all possible operational permutations of the system at the time of the creation of the algorithm, neural networks can be used in situations where not all of the factors or relationships in the data are known at the time of the creation of the network.

A method estimating NOx creation in a combustion process, combining the real-time effectiveness of a NOx sensor with the cost and weight efficiency of a model based NOx estimation would be advantageous.

SUMMARY

Method for estimating NOx creation in a combustion process of an engine including a variable volume combustion chamber includes monitoring engine sensor inputs including a cylinder pressure within the combustion chamber. A mass fraction burn value for combustion can be modeled within the combustion chamber based upon said sensor inputs, wherein said mass fraction burn value indexes a crank angle at which a selected percentage of injected fuel is burned in a combustion cycle. The state of combustion within the combustion chamber can be estimated based upon the mass fraction burn value, the state of combustion including a combustion phasing and a combustion strength. NOx creation within the combustion chamber can be estimated with a non-linear function based upon said state of combustion.

BRIEF DESCRIPTION OF THE DRAWINGS

One or more embodiments will now be described, by way of example, with reference to the accompanying drawings, in which:

FIG. 9 depicts input data points processed by a NOx creation estimating system utilizing models according to known methods and validated against measured NOx concentrations;

FIG. 10 depicts an exemplary validation of a neural network trained with a set of input data points created by a NOx creation estimating system utilizing models according to known methods and the same input data points subsequently processed by a system utilizing the trained neural network;

FIG. 11 depicts an exemplary validation of a neural network similar to the depiction within FIG. 10, utilizing sets of input data relating to different descriptive combustion terms;

FIG. 12 depicts an exemplary model of NOx creation, utilizing sets of input data relating to different descriptive combustion terms than in the exemplary depictions of FIGS. 10 and 11;

FIG. 13 depicts an exemplary model of NOx creation, utilizing sets of input data relating to different descriptive combustion terms than in the exemplary depictions of FIGS. 10-12;

DETAILED DESCRIPTION

Figure 1:
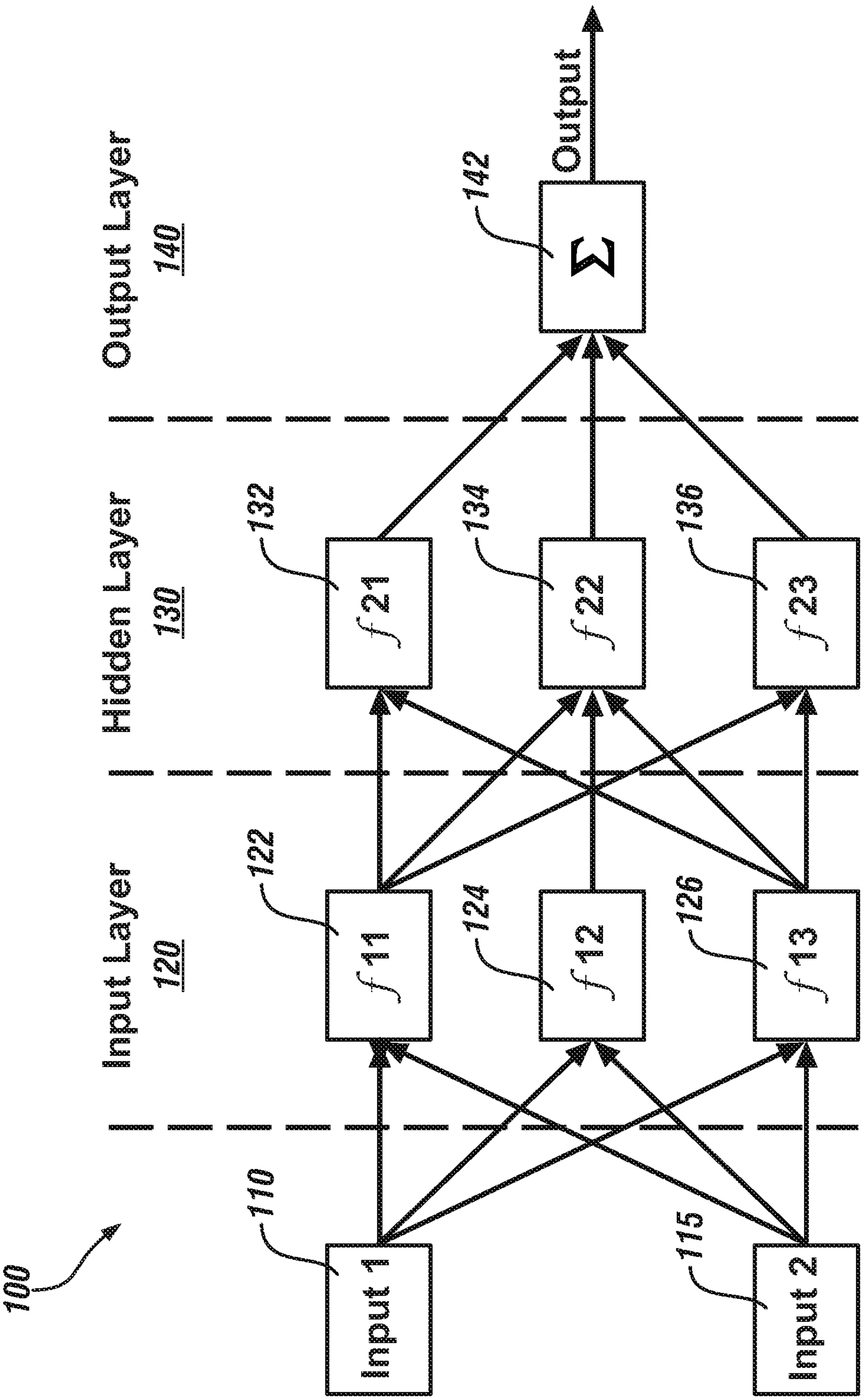
FIG. 1 depicts information flow through an exemplary artificial neural network, in accordance with the present disclosure.

Referring now to the drawings, wherein the showings are for the purpose of illustrating certain exemplary embodiments only and not for the purpose of limiting the same, FIG. 1 depicts information flow through an exemplary artificial neural network (neural network) in accordance with the present disclosure. As described above, neural networks are known to process data in consecutive layers and parallel paths within each layer through alternate nodes. Exemplary neural network 100 includes inputs 110 and 115 and three layers, including an input layer 120, a hidden layer 130, and an output layer 140. Input layer 120 includes three nodes, nodes 122, 124, and 126. Hidden layer 130 includes three nodes, nodes 132, 134, and 136. Output layer 140 includes one node, node 142. Each of the nodes in each layer provides alternate functional relationships and operations that can be performed upon information being fed to the layer. Effects of each node upon the output of that layer are adjusted by weights, and these weights are adaptable to correct the overall output of the neural network. Weights affecting the influence of each node are developed by initially training the neural network with data yielding a known set of results and adjusting weights to make the output of the neural network match the known results. Either solely as a result of this initial training or as a result of this initial training plus an adaptation factor learned through ongoing use of the neural network, weights are applied between the layers and among the nodes. By training and tuning a neural network, input data with varying factors and unknown dependencies can be analyzed to generate an estimated output.

Figure 2:
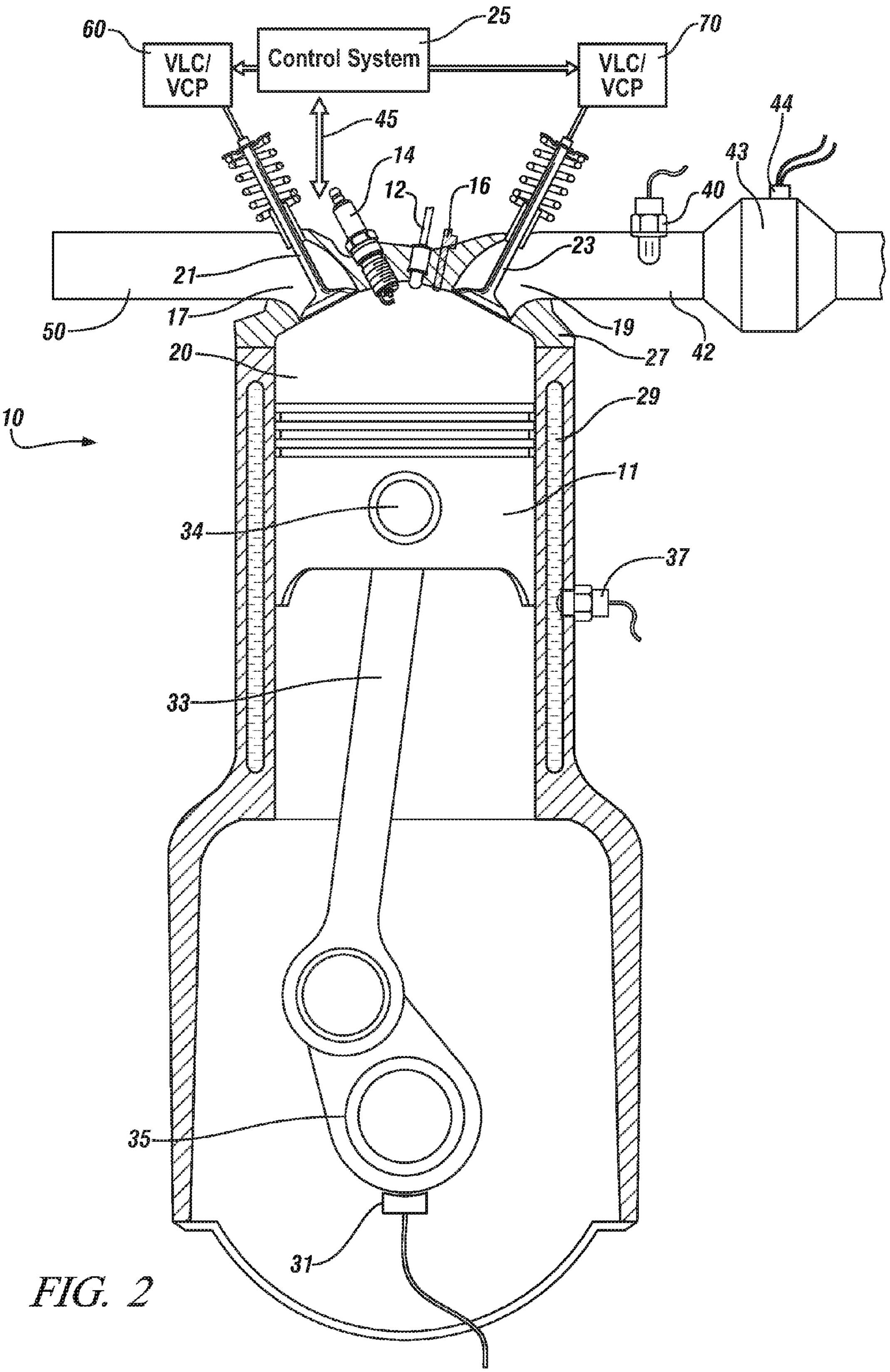
FIG. 2 schematically depicts an exemplary internal combustion engine and control system which has been constructed, in accordance with an embodiment of the present disclosure.

FIG. 2 schematically depicts an exemplary internal combustion engine 10 and control system 25 which has been constructed in accordance with an embodiment of the present disclosure. The embodiment as shown is applied as part of an overall control scheme to operate an exemplary multi-cylinder, spark ignition, direct-injection, gasoline, four-stroke internal combustion engine adapted to operate under a controlled auto-ignition process, also referred to as homogenous-charge, compression-ignition ('HCCI') mode.

In the present exemplary exposition of the disclosure, a naturally aspirated, a four-stroke, single cylinder, 0.55 liter, controlled auto-ignition, gasoline direct injection fueled internal combustion engine having a compression ratio of substantially 12 to 13 was utilized in implementing the valve and fueling controls and acquisition of the various data embodied herein. Unless specifically discussed otherwise, all such implementations and acquisitions are assumed to be carried out under standard conditions as understood by one having ordinary skill in the art.

The exemplary engine 10 includes a cast-metal engine block with a plurality of cylinders formed therein, one of which is shown, and an engine head 27. Each cylinder comprises a closed-end cylinder having a moveable, reciprocating piston 11 inserted therein. A variable volume combustion chamber 20 is formed in each cylinder, and is defined by walls of the cylinder, the moveable piston 11, and the head 27. The engine block preferably includes coolant passages 29 through which engine coolant fluid passes. A coolant temperature sensor 37, operable to monitor temperature of the coolant fluid, is located at an appropriate location, and provides a parametric signal input to the control system 25 useable to control the engine. The engine preferably includes known systems including an external exhaust gas recirculation ('EGR') valve and an intake air throttle valve (not shown).

Each moveable piston 11 comprises a device designed in accordance with known piston forming methods, and includes a top and a body which conforms substantially to the cylinder in which it operates. The piston has top or crown area that is exposed in the combustion chamber. Each piston is connected via a pin 34 and connecting rod 33 to a crankshaft 35. The crankshaft 35 is rotatably attached to the engine block at a main bearing area near a bottom portion of the engine block, such that the crankshaft is able to rotate around an axis that is perpendicular to a longitudinal axis defined by each cylinder. A crank sensor 31 is placed in an appropriate location, operable to generate a signal that is useable by the controller 25 to measure crank angle, and which is translatable to provide measures of crankshaft rotation, speed, and acceleration that are useable in various control schemes. During operation of the engine, each piston 11 moves up and down in the cylinder in a reciprocating fashion due to connection to and rotation of the crankshaft 35, and the combustion process. The rotation action of the crankshaft effects translation of linear force exerted on each piston during combustion to an angular torque output from the crankshaft, which can be transmitted to another device, e.g. a vehicle driveline.

The engine head 27 comprises a cast-metal device having one or more intake ports 17 and one or more exhaust ports 19 which flow to the combustion chamber 20. The intake port 17 supplies air to the combustion chamber 20. Combusted (burned) gases flow from the combustion chamber 20 via exhaust port 19. Flow of air through each intake port is controlled by actuation of one or more intake valves 21. Flow of combusted gases through each exhaust port is controlled by actuation of one or more exhaust valves 23.

The intake and exhaust valves 21, 23 each have a head portion that includes a top portion that is exposed to the combustion chamber. Each of the valves 21, 23 has a stem that is connected to a valve actuation device. A valve actuation device, depicted as 60, is operative to control opening and closing of each of the intake valves 21, and a second valve actuation device 70 operative to control opening and closing of each of the exhaust valves 23. Each of the valve actuation devices 60, 70 comprises a device signally connected to the control system 25 and operative to control timing, duration, and magnitude of opening and closing of each valve, either in concert or individually. The first embodiment of the exemplary engine comprises a dual overhead cam system which has variable lift control ('VLC') and variable cam phasing ('VCP'). The VCP device is operative to control timing of opening or closing of each intake valve and each exhaust valve relative to rotational position of the crankshaft and opens each valve for a fixed crank angle duration. The exemplary VLC device is operative to control magnitude of valve lift to one of two positions: one position to 3-5 mm lift for an open duration of 120-150 crank angle degrees, and another position to 9-12 mm lift for an open duration of 220-260 crank angle degrees. Individual valve actuation devices can serve the same function to the same effect. The valve actuation devices are preferably controlled by the control system 25 according to predetermined control schemes. Alternative variable valve actuation devices including, for example, fully flexible electrical or electro-hydraulic devices may also be used and have the further benefit of independent opening and closing phase control as well as substantially infinite valve lift variability within the limits of the system. A specific aspect of a control scheme to control opening and closing of the valves is described herein.

Air is inlet to the intake port 17 through an intake manifold runner 50, which receives filtered air passing through a known air metering device and a throttle device (not shown). Exhaust gas passes from the exhaust port 19 to an exhaust manifold 42, which includes exhaust gas sensors 40 operative to monitor constituents of the exhaust gas flow, and determine parameters associated therewith. The exhaust gas sensors 40 can comprise any of several known sensing devices operative to provide parametric values for the exhaust gas flow, including air/fuel ratio, or measurement of exhaust gas constituents, e.g. NOx, CO, HC, $O_2$ and others. The system may include an in-cylinder sensor 16 for monitoring combustion pressures, or non-intrusive pressure sensors or inferentially determined pressure determination (e.g. through crankshaft accelerations). The aforementioned sensors and metering devices each provide a signal as a parametric input to the control system 25. These parametric inputs can be used by the control system to determine combustion performance measurements.

Exemplary aftertreatment device 43 is illustrated, connected to exhaust manifold 42 and transmitting exhaust gas flow through the exhaust gas system. Aftertreatment device 43 can be optionally equipped with an aftertreatment sensor 44, as shown. Aftertreatment sensor can monitor important parameters to aftertreatment device 43, for example, device temperature. Aftertreatment device 43 is used to manage properties and composition of the exhaust gas flow. As aforementioned, aftertreatment devices are known to include devices effective to convert or adsorb for later treatment NOx emissions within the exhaust gas flow.

The control system 25 preferably comprises a subset of an overall control architecture operable to provide coordinated system control of the engine 10 and other systems. In overall operation, the control system 25 is operable to synthesize operator inputs, ambient conditions, engine operating parameters, and combustion performance measurements, and execute algorithms to control various actuators to achieve targets for control parameters, including such parameters as fuel economy, emissions, performance, and drivability. The control system 25 is operably connected to a plurality of devices through which an operator typically controls or directs operation of the engine. Exemplary operator inputs include an accelerator pedal, a brake pedal, transmission gear selector, and vehicle speed cruise control when the engine is employed in a vehicle. The control system may communicate with other controllers, sensors, and actuators via a local area network ('LAN') bus (not shown) which preferably allows for structured communication of control parameters and commands between various controllers.

The control system 25 is operably connected to the engine 10, and functions to acquire parametric data from sensors, and control a variety of actuators of the engine 10 over appropriate interfaces 45. The control system 25 receives an engine torque command, and generates a desired torque output, based upon the operator inputs. Exemplary engine operating parameters that are sensed by control system 25 using the aforementioned sensors include engine temperature, as indexed by methods such as monitoring engine coolant temperature, oil temperature, or metal temperature; crankshaft rotational speed ('RPM') and position; manifold absolute pressure; ambient air flow and temperature; and ambient air pressure. Combustion performance measurements typically comprise measured and inferred combustion parameters, including air/fuel ratio, location of peak combustion pressure, among others.

Actuators controlled by the control system 25 include: fuel injectors 12; the VCP/VLC valve actuation devices 60, 70; spark plug 14 operably connected to ignition modules for controlling spark dwell and timing; exhaust gas recirculation (EGR) valve (not shown), and, electronic throttle control module (not shown). Fuel injector 12 is preferably operable to inject fuel directly into each combustion chamber 20. Specific details of exemplary direct injection fuel injectors are known and not detailed herein. Spark plug 14 is employed by the control system 25 to enhance ignition timing control of the exemplary engine across portions of the engine speed and load operating range. When the exemplary engine is operated in a purely HCCI mode, the engine does not utilize an energized spark plug. However, it has proven desirable to employ spark ignition to complement the HCCI mode under certain conditions, including, e.g. during cold start, to prevent fouling and, in accordance with certain aspects of the present disclosure at low load operating conditions near a low-load limit. Also, it has proven preferable to employ spark ignition at a high load operation limit in the HCCI mode, and at high speed/load operating conditions under throttled or un-throttled spark-ignition operation.

The control system 25 preferably comprises a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the desired functions.

Algorithms for engine control are typically executed during preset loop cycles such that each algorithm is executed at least once each loop cycle. Algorithms stored in the non-volatile memory devices are executed by the central processing unit and are operable to monitor inputs from the sensing devices and execute control and diagnostic routines to control operation of the engine, using preset calibrations. Loop cycles are typically executed at regular intervals, for example each 3.125, 6.25, 12.5, 25 and 100 milliseconds during ongoing engine operation. Alternatively, algorithms may be executed in response to occurrence of an event or interrupt request.

Figure 3:
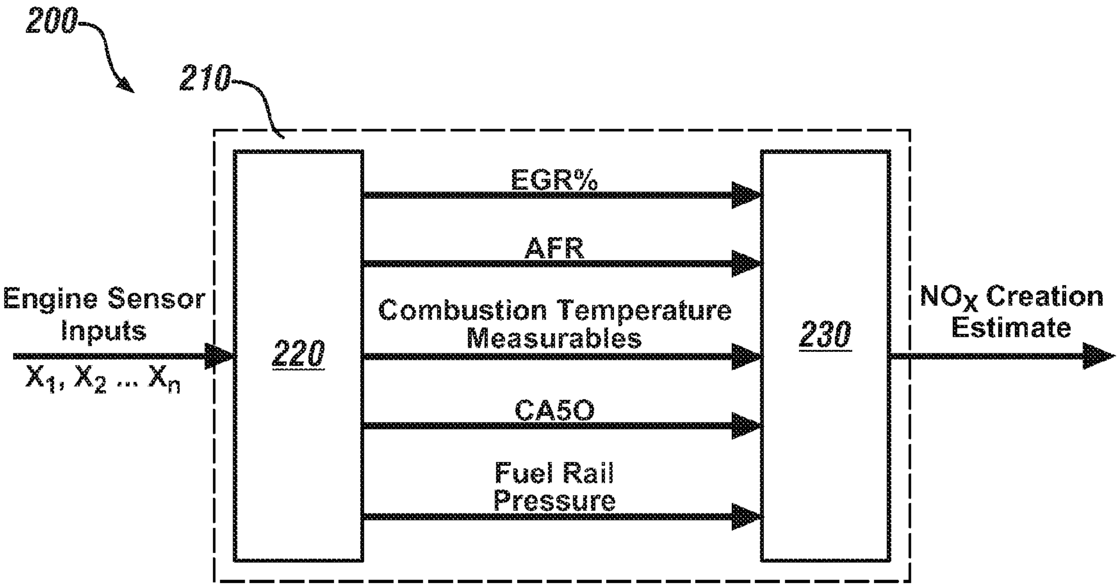
FIG. 3 schematically depicts an exemplary NOx model module, utilized within an engine control module and determining an NOx creation estimate, in accordance with the present disclosure.

FIG. 3 schematically depicts an exemplary NOx model module, utilized within an engine control module and determining a NOx creation estimate, in accordance with the present disclosure. Exemplary NOx model module 200 is operated within NOx creation estimating system 210 and comprises a model module 220 and a NOx estimation module 230. Engine sensor inputs $x_1$ through $x_n$ are inputs to the NOx model module and can include a number of factors, including temperatures, pressures, engine control settings including valve and spark timings, and other readings indicative of combustion state within the combustion chamber. Model module 220 receives these inputs and applies algorithms to determine a number of parameters to describe combustion within the combustion chamber. Examples of these descriptive parameters include EGR %, the percentage of exhaust gas diverted back into the combustion chamber in order to control the control the combustion process; an air-fuel charge ratio (AFR) describing the mixture of air and fuel present in the combustion chamber; combustion temperature measurables, including, for example, either combustion burned gas temperature or average combustion temperature; a combustion timing measurable tracking the progress of combustion through a combustion process, for example CA50, a measurement of at what crank angle 50% of the mass of fuel originally present in the combustion chamber is combusted; and fuel rail pressure, indicating the pressure of fuel available to fuel injectors to be sprayed into the combustion chamber. These descriptive parameters can be used to estimate conditions present within the combustion chamber through the combustion process. As described above, conditions present within the combustion chamber affect the creation of NOx in the combustion process. These descriptive parameters can be fed to NOx estimation module, wherein algorithms utilize the descriptive parameters as inputs to generate an estimate of NOx creation due to the combustion process. However, as described above, models analyzing variable descriptive of the combustion process can include complex calculations which can take longer to calculate than required for generating real-time results, require large amounts of processing capability, and are only as accurate as the pre-programmed algorithm permits. As a result of these challenges and a need for accurate and timely information, estimation of NOx creation within an ECM as part of an aftertreatment control strategy is not preferable.

A method is disclosed, combining models describing the combustion process with neural networks configured to generate a NOx creation estimate based upon the output of the models. The neural network allows this NOx estimation to include factors not known or indeterminable at the time the neural network is created, such as unknown rates of heat transfer and particulars of the chemical combustion process, affected by such factors as fuel content, air quality, vehicle maintenance status, or other unknowns. Additionally, the neural network frequently allows the complexity of algorithms required to produce a NOx creation estimate to be reduced. Neural networks are trained and react to patterns in the data. NOx estimation models instead require analysis of factor such as charge ignition dynamics, projections of temperatures at different areas within the combustion chamber, an analysis of charge distribution within the chamber through the combustion process. By simplifying the NOx creation estimate from an involved combustion analysis to an analysis focused more on data trends allows for simpler algorithms, requiring reduced processing resources and capable of being calculated in real-time.

A variety of engine sensor inputs can be used to quantify parameters descriptive of the combustion process. However, combustion occurring within the engine is difficult to directly monitor. Sensors may detect and measure fuel flow and air flow into the cylinder, a sensor may monitor a particular voltage being applied to a spark plug or a processor may gather a sum of information that would predict conditions necessary to generate an auto-ignition, but these readings together are merely predictive of combustion and do not measure actual combustion results. One exemplary method measuring actual combustion results utilizes pressure measurements taken from within the combustion chamber through a combustion process. Cylinder pressure readings provide tangible readings describing conditions within the combustion chamber. Based upon an understanding of the combustion process, cylinder pressures may be analyzed to estimate the state of the combustion process within a particular cylinder, describing the combustion in terms of both combustion phasing and combustion strength. Combustion of a known charge at known timing under known conditions produces a predictable pressure within the cylinder. By describing the phase and the strength of the combustion at certain crank angles, the initiation and the progression of a particular combustion process may be described as an estimated state of combustion. By estimating the state of the combustion process for a cylinder, factors affecting NOx creation through the combustion process can be determined and made available for use in NOx creation estimation.

Figure 4:
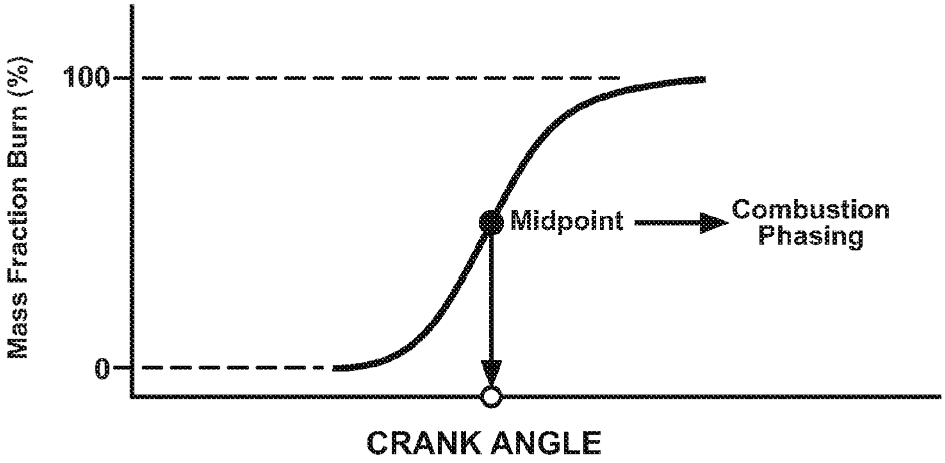
FIG. 4 graphically illustrates an exemplary mass fraction burn curve, in accordance with the present disclosure.

One known method for monitoring combustion phasing is to estimate the mass fraction burn ratio for a given crank angle based upon known parameters. The mass fraction burn ratio describes what percentage of the charge in the combustion chamber has been combusted and serves as a good estimate of combustion phasing. FIG. 4 graphically illustrates an exemplary mass fraction burn curve in accordance with the present disclosure. For a given crank angle, the curve depicted describes the estimated percentage of fuel air mixture within the charge that has been combusted for that combustion process. In order to be used as a metric of combustion phasing, it is known to identify either a particular mass fraction burn percentage of interest or a particular crank angle of interest. FIG. 4 identifies CA50% as a crank angle at which the mass fraction burn equals 50%. By examining this particular metric across a plurality of combustion processes in this cylinder or across a number of cylinders, the comparative phasing of the particular combustion processes may be described.

As described above, combustion phasing can be utilized to estimate the state of a particular combustion process. An exemplary method for monitoring combustion phasing to diagnose ineffective combustion is disclosed whereby combustion in an engine is monitored, mass fraction burn ratios are generated for each cylinder combustion process, and the combustion phasing across the cylinders are compared. If the combustion phase for one cylinder at a particular crank angle for that first cylinder differs by more than a threshold phase difference from the combustion phase for another cylinder at the same crank angle for that second cylinder, anomalous combustion can be inferred. Many sources of anomalous combustion may be diagnosed by this method. For example, if some condition causes early ignition or knocking within the combustion chamber, the cylinder pressure readings will exhibit different values than normal combustion. Additionally, fuel system injection timing faults, causing injection of the charge at incorrect timing, will cause anomalous cylinder pressure readings. Further, if a cylinder misfires or never achieves combustion, the cylinder pressure readings will exhibit different values than normal combustion. Similarly, pressure curves may be used to diagnose other abnormal combustion conditions, such as changes in the air fuel mixture, changes in camshaft phasing, and maintenance failures to related components. Any such diagnoses of combustion health have implications to NOx and can be useful to estimate NOx creation.

Many methods are known to estimate mass fraction burn. One method examines pressure data from within the combustion chamber, including analyzing the pressure rise within the chamber attributable to combustion. Various methods exist to quantify pressure rise in a cylinder attributable to combustion. Pressure ratio management (PRM) is a method based upon the Rassweiler approach, which states that mass fraction burn may be approximated by the fractional pressure rise due to combustion. Combustion of a known charge at a known time under known conditions tends to produce a consistently predictable pressure rise within the cylinder. PRM derives a pressure ratio (PR) from the ratio of a measured cylinder pressure under combustion at a given crank angle ($P_{CYL}(\theta)$) to a calculated motored pressure, estimating a pressure value if no combustion took place in the cylinder, at a given crank angle ($P_{MOT}(\theta)$), resulting in the following equation.

$$PR(\theta) = \frac{P_{CYL}(\theta)}{P_{MOT}(\theta)} \quad (1)$$

Figure 5:
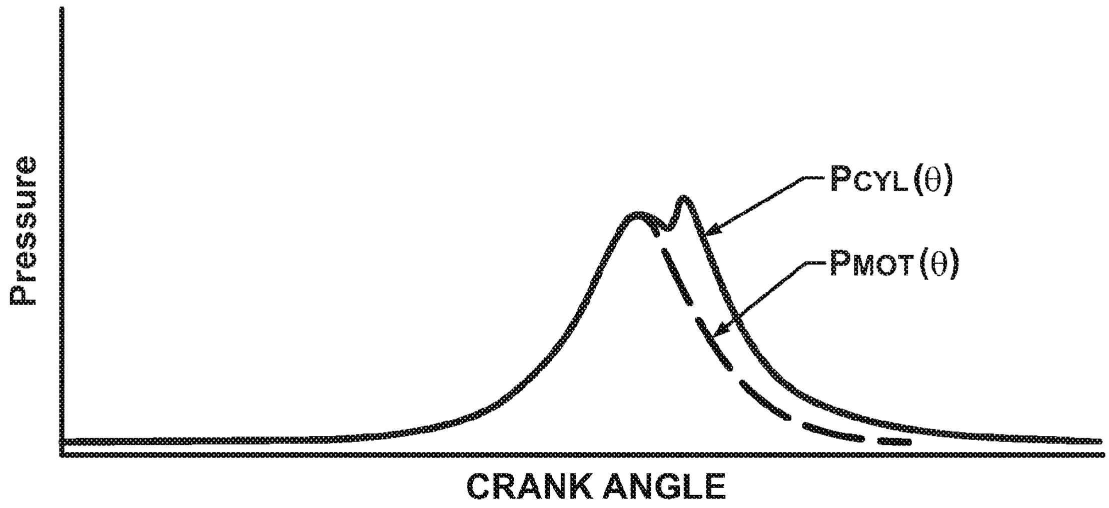
FIG. 5 graphically illustrates an exemplary cylinder pressure plotted against crank angle through a combustion process, in accordance with the present disclosure.

FIG. 5 graphically illustrates an exemplary cylinder pressure plotted against crank angle through a combustion process, in accordance with the present disclosure. $P_{MOT}(\theta)$ exhibits a smooth, inverse parabolic peak from the piston compressing a trapped pocket of gas without any combustion. All valves are closed with the piston at BDC, the piston rises compressing the gas, the piston reaches TDC at the peak of the pressure curve, and the pressure reduces as the piston falls away from TDC. A rise in pressure above $P_{MOT}(\theta)$ is depicted by $P_{CYL}(\theta)$. The timing of combustion will vary from application to application. In this particular exemplary curve, $P_{CYL}(\theta)$ begins to rise from $P_{MOT}(\theta)$ around TDC, describing an ignition event sometime before TDC. As the charge combusts, heat and work result from the combustion, resulting in an increase in pressure within the combustion chamber. PR is a ratio of $P_{MOT}$ to $P_{CYL}$, and $P_{MOT}$ is a component of $P_{CYL}$. Net combustion pressure (NCP(θ)) is the difference between $P_{CYL}(\theta)$ and $P_{MOT}(\theta)$ or the pressure rise in the combustion chamber attributable to combustion at a given crank angle. It will be appreciated that by subtracting one from PR, a ratio of NCP to $P_{MOT}$ may be determined $$PR(\theta)-1=\frac{P_{CYL}(\theta)}{P_{MOT}(\theta)}-\frac{P_{MOT}(\theta)}{P_{MOT}(\theta)}=\frac{NCP(\theta)}{P_{MOT}(\theta)} \quad (2)$$

PR measured through the equation above therefore may be used to directly describe the strength of combustion within a cylinder. Normalizing PR minus one at crank angle θ to an expected or theoretical maximum PR value minus one yields a fractional pressure ratio of the pressure rise due to combustion at crank angle θ to the expected total pressure rise due to combustion at the completion of the combustion process. This normalization can be expressed by the following equation.

$$FPR(\theta)=\frac{PR(\theta)-1}{PR(90^\circ)-1}\propto MassFractionBurn(\theta) \quad (3)$$

This fractional pressure ratio, by equating pressure rise attributable to combustion to the progression of combustion, describes the mass fraction burn for that particular combustion process. By utilizing PRM, pressure readings from a cylinder may be used to estimate mass fraction burn for that cylinder.

The above method utilizing PRM is applicable for broad ranges of temperature, cylinder charge and timings associated with compression ignition engines, with the added benefit of not requiring calibrated pressure sensors. Because PR is a ratio of pressures, a non-calibrated linear pressure transducer may be utilized to acquire pressure data readings from each cylinder.

Another method to estimate mass fraction burn is to directly utilize the Rassweiler approach to determine mass fraction burn by calculating the total heat released for a given crank angle. The Rassweiler approach utilizes pressure readings from a cylinder to approximate the incremental heat release in the cylinder. This approach is given by the following equation.

$$Q_{Released}(\theta)=\sum P_{k+1}-P_{k-1}\left(\frac{V_{k-1}}{V_k}\right)^r \quad (4)$$

Mass fraction burn, a measure of how much of the charge has been combusted by a certain crank angle, may be approximated by determining what fraction of heat release for a combustion process has taken place at a given crank angle. The incremental heat release determined by the Rassweiler approach may be summed over a range of crank angles, compared to the total expected or theoretical heat release for the combustion process, and utilized to estimate mass fraction burn. For example, if 75% of the total expected heat release has been realized for a given crank angle, we can estimate that 75% of the combustion for the cycle has taken place at that crank angle.

Other methods may be used to estimate mass fraction burn. One method quantifies the rate of change of energy within the combustion chamber due to combustion through an analysis of classical heat release measures based on analysis of the heat released and work performed through the combustion of the charge. Such analyses are focused on the First Law of Thermodynamics, which states that the net change on energy in a close system is equal to the sum of the heat and work added to the system. Applied to a combustion chamber, the energy increase in the combustion chamber and the enclosed gases equals the heat transferred to the walls of the chamber and the gases plus the expansive work performed by the combustion.

An exemplary method utilizing these classic heat release measures to approximate a mass fraction burn estimate analyzes the rate of heat release by charge combustion throughout combustion process. This rate of heat release, $dQ_{ch}/d\theta$, may be integrated over a range of crank angles in order to describe the net energy released in the form of heat. Through derivations well known in the art, this heat release may be expressed through the following equation.

$$Q=\int\frac{dQ_{ch}}{d\theta}=\int\left(\frac{\gamma}{\gamma-1}p\frac{dV}{d\theta}+\frac{1}{\gamma-1}V\frac{dp}{d\theta}\right) \quad (5)$$

Gamma, γ, comprises a ratio of specific heats and is nominally chosen as that for air at the temperature corresponding to those used for computing the signal bias and without EGR. Thus, nominally or initially γ=1.365 for diesel engines and nominally γ=1.30 for conventional gasoline engines. These can however be adjusted based on the data from the specific heats for air and stoichiometric products using an estimate of the equivalence ratio, ϕ, and EGR molar fraction targeted for the operating condition and using the relation that $[\gamma=1+(R/c_v)]$, wherein R is the universal gas constant, and the weighted average of air and product properties through the expression.

$$c_v(T)=(1.0-\phi*EGR)*c_{vair}(T)+(\phi*EGR)*c_{vstoichprod}(T) \quad (6)$$

With the expression evaluated at the gas temperature corresponding to that for pressures sampled for the computation of signal bias.

Whether calculated through the preceding method or by some other method known in the art, the calculation of energy released within the combustion process for a given crank angle may be compared to an expected or theoretical total energy release for the combustion process. This comparison yields an estimate of mass fraction burn for use in describing combustion phasing.

The methods described hereinabove are readily reduced to be programmed into a microcontroller or other device for execution during ongoing operation of an internal combustion engine, as follows.

Once a mass fraction burn curve is generated for a particular combustion process, the curve is useful to evaluate the combustion phasing for that particular combustion process. Referring again to FIG. 5, a reference point is taken from which to compare mass fraction burn estimates from different combustion processes. In this particular embodiment, CA50%, representing the crank angle at which 50% of the charge is combusted, is selected. Other measures can be selected so long as the same measure is used for every comparison.

Determination of mass fraction burn values is a practice well known in the art. Although exemplary methods are described above for determining mass fraction burn, the methods disclosed herein to utilize mass fraction burn values to diagnose cylinder combustion issues may be used with any method to determine mass fraction burn. Any practice for developing mass fraction burn may be utilized, and this disclosure is not intended to be limited to the specific methods described herein.

Additional methods exist to analyze cylinder pressure signals. Methods are known for processing complex or noisy signals and reducing them to useful information. One such method includes spectrum analysis through Fast Fourier Transforms (FFT). FFTs reduce a periodic or repeating signal into a sum of harmonic signals useful to transform the signal into the components of its frequency spectrum. Once the components of the signal have been identified, they may be analyzed and information may be taken from the signal.

Pressure readings from the pressure transducers located in or in communication with the combustion cylinders contain information directly related to the combustion occurring within the combustion chamber. However, engines are very complex mechanisms, and these pressure readings can contain, in addition to a measure of $P_{CYL}(\theta)$, a multitude of pressure oscillations from other sources. Fast Fourier Transforms (FFTs) are mathematical methods well known in the art. One FFT method known as spectrum analysis analyzes a complex signal and separates the signal into its component parts which may be represented as a sum of harmonics. Spectrum analysis of a pressure transducer signal represented by $f(\theta)$ may be represented as follows.

$$FFT(f(\theta))=A_0+(A_1\sin(\omega_0\theta+\phi_1)+(A_2\sin(2\omega_0\theta+\phi_2))+\ldots+(A_N\sin(N\omega_0\theta+\phi_N)) \tag{7}$$

Each component N of the signal $f(\theta)$ represents a periodic input on the pressure within the combustion chamber, each increasing increment of N including signals or higher frequency. Experimental analysis has shown that the pressure oscillation caused by combustion and the piston moving through the various stages of the combustion process, $P_{CYL}(\theta)$, tends to be the first, lowest frequency harmonic. By isolating this first harmonic signal, $P_{CYL}(\theta)$ can be measured and evaluated. As is well known in the art, FFTs provide information regarding the magnitude and phase of each identified harmonic, captured as the $\phi$ term in each harmonic of the above equation. The angle of first harmonic, or $\phi_1$, is, therefore, the dominant term tracking combustion phasing information. By analyzing the component of the FFT output related to $P_{CYL}$, the phasing information of this component can be quantified and compared to either expected phasing or the phasing of other cylinders. This comparison allows for the measured phasing values to be evaluated and a warning indicated if the difference is greater than a threshold phasing difference, indicating combustion issues in that cylinder.

Signals analyzed through FFTs are most efficiently estimated when the input signal is at steady state. Transient effects of a changing input signal can create errors in the estimations performed. While methods are known to compensate for the effects of transient input signals, the methods disclosed herein are best performed at either idle or steady, average engine speed conditions in which the effects of transients are eliminated. One known method to accomplish the test in an acceptably steady test period is to take samples and utilize an algorithm within the control module to either validate or disqualify the test data as being taken during a steady period of engine operation.

It should be noted that although the test data is preferably taken at idle or steady engine operation, information derived from these analyses can be utilized by complex algorithms or engine models to effect more accurate engine control throughout various ranges of engine operation. For example, if testing and analysis at idle shows that cylinder number four has a partially clogged injector, fuel injection timing could be modified for this cylinder throughout different ranges of operation to compensate for the perceived issue.

Once cylinder pressure signals have been analyzed through FFTs, information from the pressure signal can be used in variety of ways to analyze the combustion process. For example, the analyzed pressure signal can be used to generate a fractional pressure ratio as discussed in methods above and used to describe the mass fraction burn percentage to describe the progress of the combustion process.

Once a measure such as pressure readings are available, other descriptive parameters relating to a combustion process can be calculated. Sub-models describing particular characteristics of a combustion process can be employed utilizing physical characteristics and relationships well known in the art to translate cylinder pressures and other readily available engine sensor terms into variable descriptive of the combustion process. For example, volumetric efficiency, a ratio of air-fuel charge entering the cylinder as compared to the capacity of the cylinder, can be expressed through the following equation.

$$\eta=f(RPM,P_{im},\dot{m}_a) \tag{8}$$

RPM, or engine speed, is easily measurable through a crankshaft speed sensor, as describe above. $P_{im}$, or intake manifold pressure, is typically measured as related to engine control, and is a readily available term. $\dot{m}_a$, or the fresh mass air flow portion of the charge flowing into the cylinder, is also a term frequently measured in the air intake system of the engine or can alternatively be easily derived from $P_{im}$, ambient barometric pressure, and known characteristics of the air intake system. Another variable descriptive of the combustion process that can be derived from cylinder pressures and other readily available sensor readings is charge flow into the cylinder, $\dot{m}_c$. $\dot{m}_c$ can be determined by the following equation.

$$\dot{m}_c=\frac{P_{im}\cdot rpm\cdot D\cdot\eta}{2RT_{im}} \tag{9}$$

D equals the displacement of the engine. R is a gas constant well known in the art. $T_{im}$ is a temperature reading from the inlet manifold. Another variable descriptive of the combustion process that can be derived from cylinder pressures and other readily available sensor readings is EGR %, or the percentage of exhaust gas being diverted into the exhaust gas recirculation circuit. EGR % can be determined by the following equation.

$$EGR\ \% = 1-\frac{\dot{m}_a}{\dot{m}_c} \tag{10}$$

Yet another variable descriptive of the combustion process that can be derived from cylinder pressures and other readily available sensor readings is CAx, wherein x equals a desired fractional pressure ratio. CAx can be determined by the following equation, closely related to equation (2) above.

$$Z=\frac{P_{CYL}(\theta)}{P_{MOT}(\theta)}-1 \tag{11}$$

Filling in the desired fractional pressure ratio as Z and solving for $\theta$ yields CAx. For instance CA50 can be determined as follows.

$$\frac{P_{CYL}(\theta)}{P_{MOT}(\theta)} = 1.5 \quad (12)$$

Figure 6:
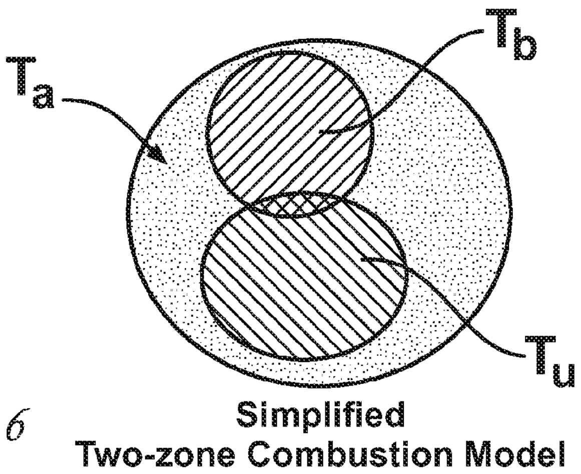
FIG. 6 depicts a number of different temperatures capable of estimation within the combustion chamber important to describing the combustion process, in accordance with the present disclosure.

Various temperatures within the combustion chamber can also be estimated from cylinder pressures and other readily available sensor readings. FIG. 6 depicts a number of different temperatures capable of estimation within the combustion chamber important to describing the combustion process, in accordance with the present disclosure. $T_a$, the average temperature within the combustion chamber can be determined by the following equation.

$$T_a = \frac{P_{max} \cdot V(PPL)}{1.05 * \dot{m}_c R} \quad (13)$$

$P_{max}$ is the maximum pressure achieved within the combustion chamber through the combustion process. PPL is a measure of the crank angle at which $P_{max}$ occurs. V(PPL) is the volume of the cylinder at the point $P_{max}$ occurs. $T_u$, the average temperature of the not yet combusted or unburned portion of the charge within the combustion chamber, can be determined by the following equation.

$$T_u = \frac{1.05 * \dot{m}_c}{1.05 * \dot{m}_c - \alpha \cdot \dot{m}_f \lambda_S}[0.05\beta T_{ex} + 0.95 T_{im}]\left(\frac{P_{max} - \Delta P}{P_{im}}\right)^{\frac{r-1}{r}} \quad (14)$$

$\dot{m}_f$ is the fuel mass flow, and can be determined either from a known fuel rail pressure in combination with known properties and operation of the fuel injectors or from $\dot{m}_c$ and $\dot{m}_a$. α and β are calibrations based on engine speed and load and may be developed experimentally, empirically, predictively, through modeling or other techniques adequate to accurately predict engine operation, and a multitude of calibration curves might be used by the same engine for each cylinder and for different engine settings, conditions, or operating ranges. $\lambda_S$ is the stoichiometric air-fuel ratio for the particular fuel and includes values well known in the art. $T_{ex}$ is a measured exhaust gas temperature. $T_{im}$ and $P_{im}$ are temperature and pressure readings taken at the intake manifold. $P_{max}-\Delta P$ describes the pressure in the combustion chamber just before the start of combustion. γ is a specific heat constant described above. $T_b$, the average temperature of the combusted or burned portion of the charge within the combustion chamber, can be determined by the following equation.

$$T_b = \frac{T_a - (1 - x_b)T_u}{x_b},\ x_b = \frac{\alpha \cdot \dot{m}_f(1 + \lambda_S)}{1.05\dot{m}_c} \quad (15)$$

Note that the above equations are simplified in a method well known in the art by neglecting heat loss to cylinder wall. Methods to compensate for this simplification are well known in the art and will not be described in detail herein. Through the use of the aforementioned relationships and derivations, cylinder pressure and other readily available sensor readings can be used to determine a number of parameters descriptive of the combustion process being monitored.

Figure 7:
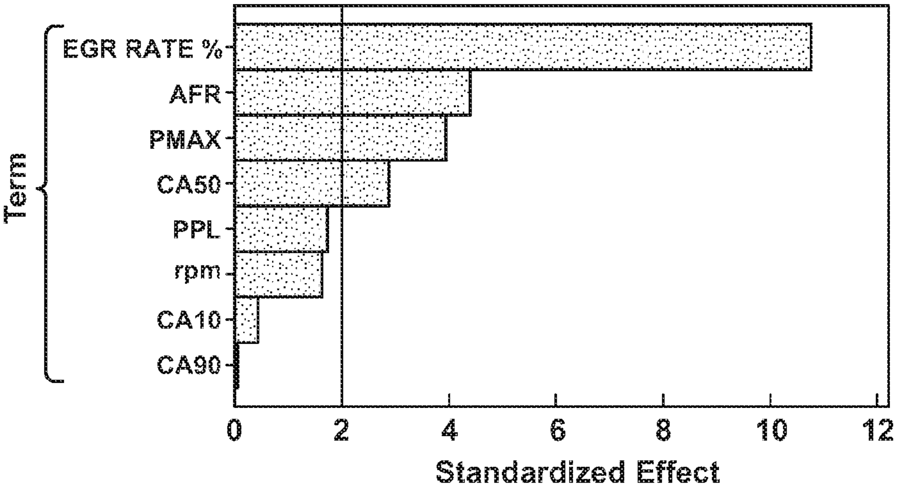
FIG. 7 is a graphical depiction of exemplary modeled results describing standardized effects of a number of inputs to NOx emissions under a given set of conditions, in accordance with the present disclosure.

As described above, cylinder pressure readings can be used to describe a state of combustion occurring within the combustion chamber for use as a factor in estimating NOx creation. Also as described above, a number of other factors are important to accurately estimating NOx creation. FIG. 7 is a graphical depiction of exemplary modeled results describing standardized effects of a number of inputs to NOx emissions under a given set of conditions, in accordance with the present disclosure. As described above, methods are known utilizing a model module and a NOx estimation module to simulate or estimate NOx creation based upon known characteristics of an engine. The model utilized to characterize NOx creation by a combustion process in this particular exemplary analysis can be characterized by the following expression.

$$NOx = NNT(P\text{max}, CA50, CAp\text{max}, EGR\ \%, AFR) \quad (16)$$

As shown in the graphical results of FIG. 7, a number of factors have varying effects on NOx creation. Under this particular set of conditions, EGR % has the largest impact upon NOx creation for the engine modeled. In this instance, by methods well known in the art, recirculating a particular amount of exhaust gas back into the combustion chamber through the EGR circuit lowers the adiabatic flame temperature of the combustion process, thereby lowering the temperatures that nitrogen and oxygen molecules are exposed to during combustion and, thereby, lowering the rate of NOx creation. By studying such models under various engine operating conditions, the neural network can be provided with the most useful inputs to provide accurate estimates of NOx creation. Additionally, studying such models provides information useful to selecting input data to initially train the neural network, varying inputs and providing corresponding outputs to sensor inputs and descriptive parameters most likely to impact NOx creation.

Figure 8:
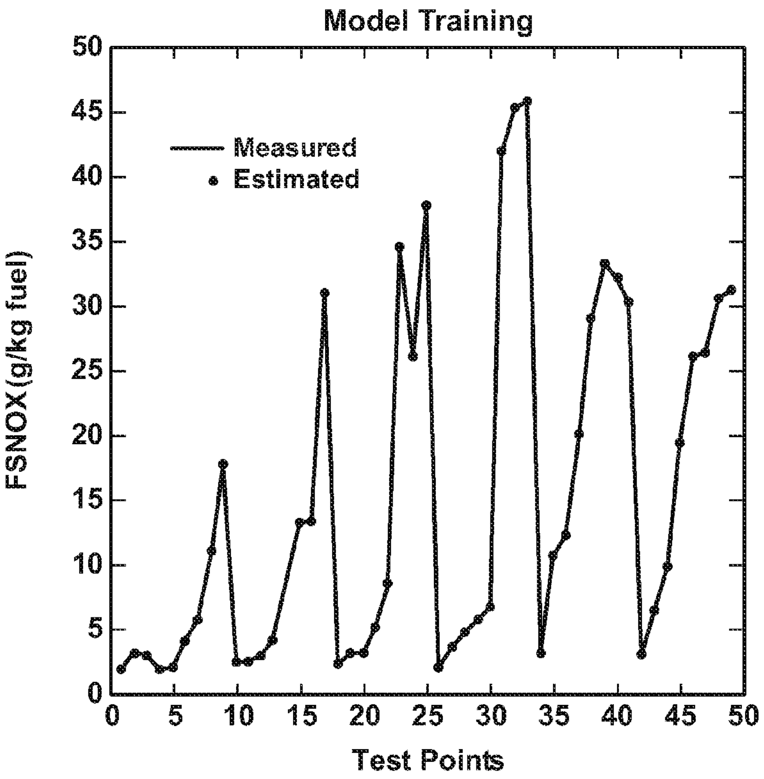
FIG. 8 graphically depicts a data set used to initially train a neural network along with confirming estimated results generated by the neural network after the training, in accordance with the present disclosure.
Figure 9:
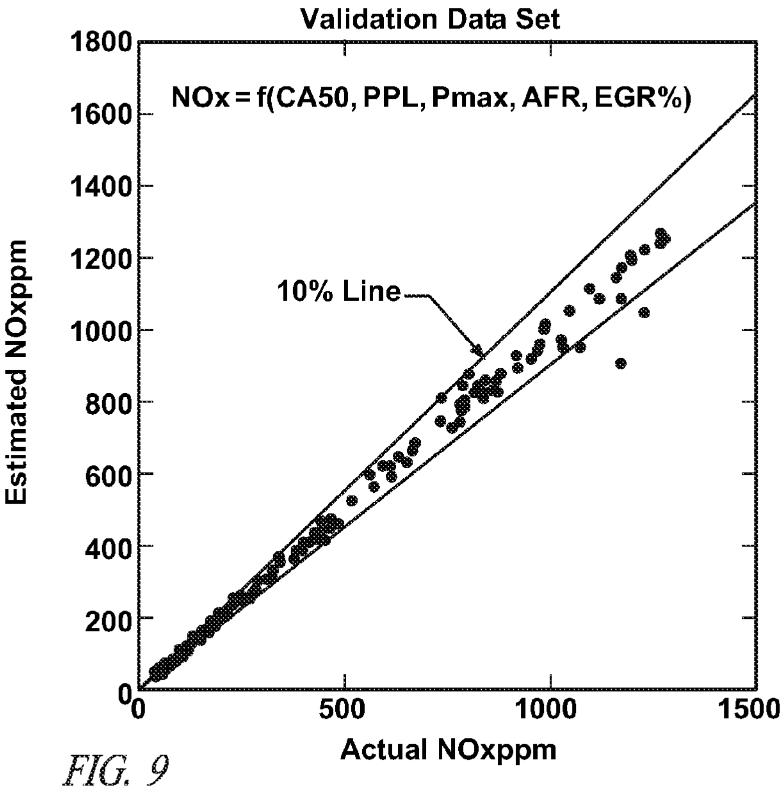
FIGS. 9-13 graphically depict exemplary training/validation results generated to confirm initial training of a neural network programmed to estimate NOx creation estimates, in accordance with the present disclosure.

As described above, a neural network must be initially trained with data correlating to known outputs or results. FIG. 8 graphically depicts a data set used to initially train a neural network along with confirming estimated results generated by the neural network after the training, in accordance with the present disclosure. The solid line represents various data points, each with varying sensor inputs representing different engine operating conditions and corresponding measured or model generated NOx creation responses. Once the neural network has been trained, it can be initially tested to confirm whether the training inputs, now reentered without the known results, generate estimated NOx creation results within acceptable estimation tolerances. Neural networks can be further tested by providing additional data sets and comparing the results from the neural network to either tested and measured results or model generated results. FIGS. 9-13 graphically depict exemplary training/validation results generated to confirm initial training of a neural network programmed to estimate NOx creation estimates, in accordance with the present disclosure. FIG. 9 depicts input data points fed through a validation model and compared with actual NOx concentration measurements, collected by methods known in the art. The model utilized to characterize NOx creation by a combustion process in this particular exemplary analysis can be characterized by the following expression.

$$NOx = f(CA50, PPL, P\text{max}, AFR, EGR\ \%) \quad (17)$$

As described above, such models are known in the art but include weaknesses prohibiting real-time NOx calculation. In relation to the present data and results, a 10% line is drawn on either side of the 1:1 equivalence, depicting an indication when the results estimated from the two different methods differ by more than 10%. Different error margins can be utilized depending upon the particular application and the sensitivity of the devices and systems involved. In this exemplary graph, a set of validation results collected by known means in a laboratory setting are shown to be within reasonable error levels of actual NOx concentration levels.

Figure 10:
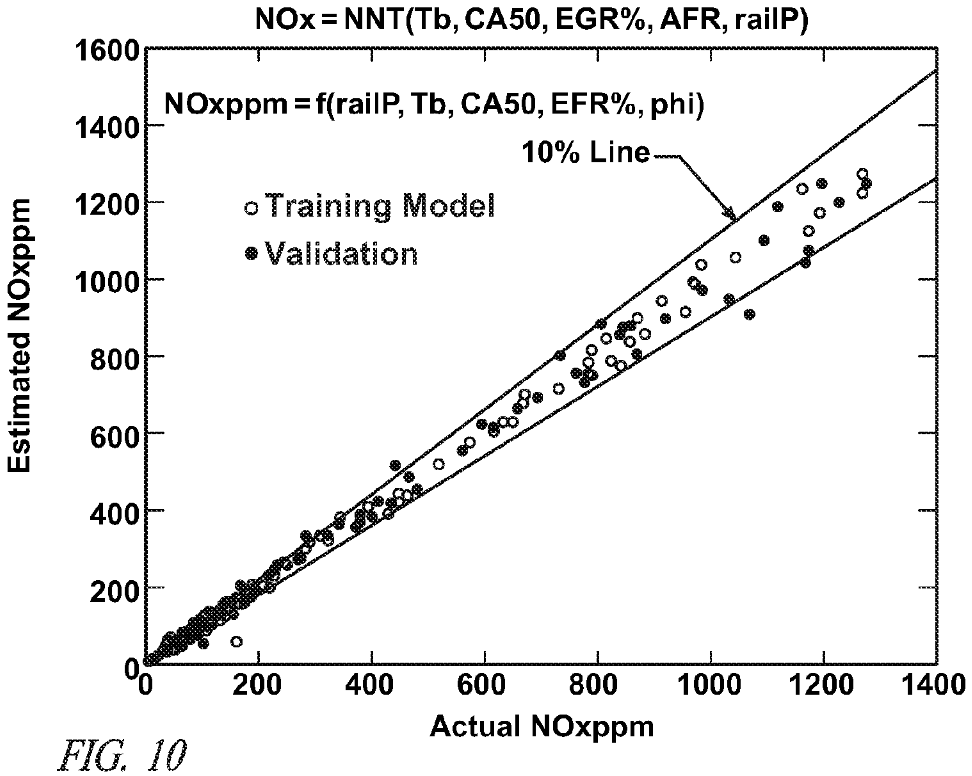

FIG. 10 depicts input data points fed through a NOx creation estimating system utilizing models according to known methods and the same input data points fed through a system utilizing a trained neural network according to the methods of the present disclosure. The model utilized to characterize NOx creation by a combustion process in this particular exemplary analysis can be characterized by the following expression.

$$NOx=NNT(Tb,CA50,EGR\ \%,AFR,\mathrm{rail}P) \quad (18)$$

Variance of the points from a 1:1 equivalence from the x and y axes of the graph illustrates discrepancies between the neural-network based method and actual NOx concentration levels measured to validate the model. In relation to the present data and results, a 10% line is drawn on either side of the 1:1 equivalence, depicting an indication when the results estimated from the two different methods differ by more than 10%. In this exemplary graph, two data sets are shown for comparison: first, a neural network training model comprising data sets pre-validated by methods such as depicted in FIG. 9 and utilized to train the neural network being tested; and second, a set of validation results created through the trained neural network. Strong correlation is shown between the training model and the validation results, and it is shown that this particular neural network achieved results almost entirely within the 10% error margin as compared to actual NOx concentration measurements. Such a graph can be utilized to validate a trained neural network and determine according to various operating conditions how well the neural network estimates NOx creation as compared to known modeling methods.

Figure 11:
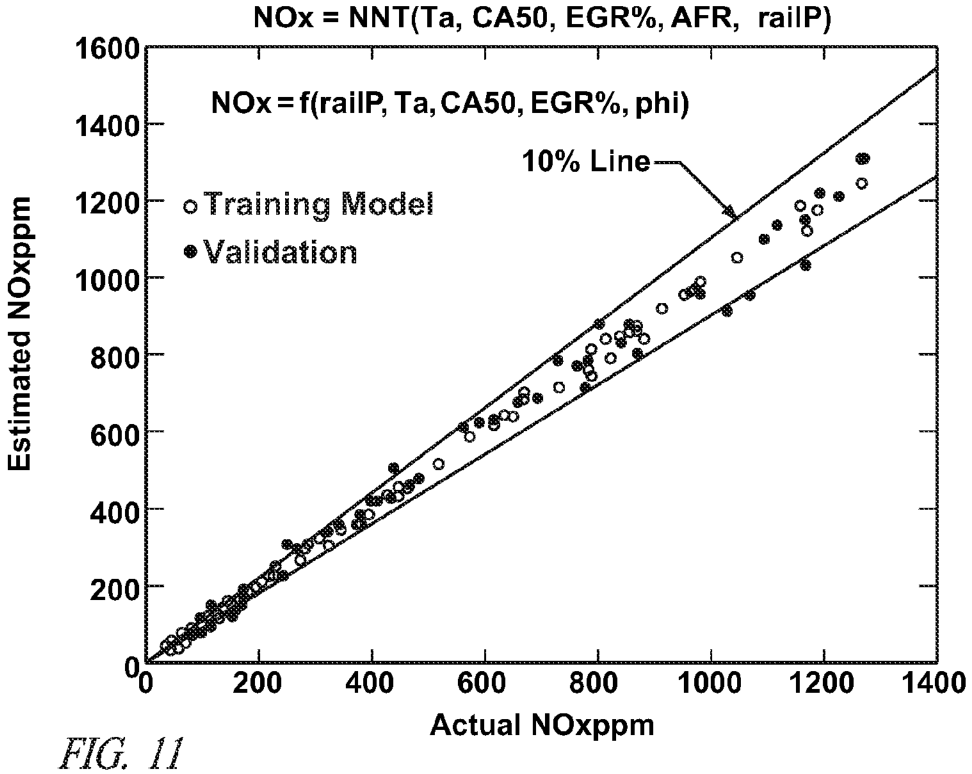
Figure 12:
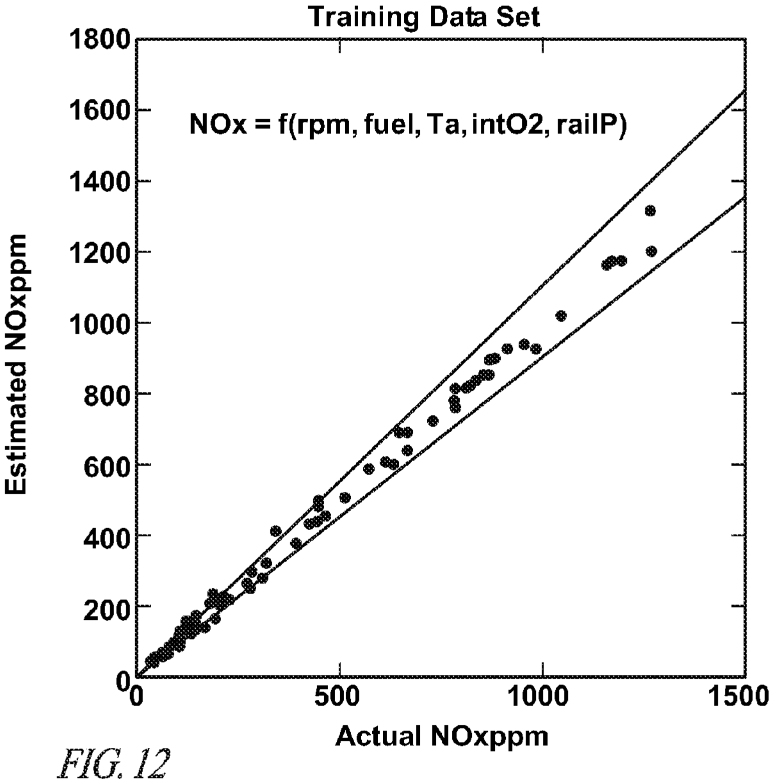
Figure 13:
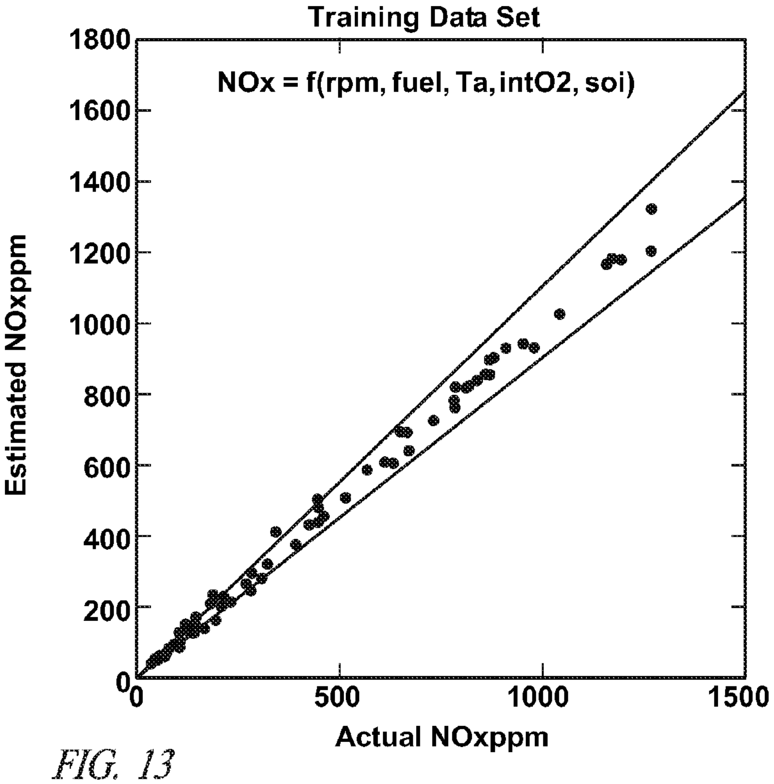

FIGS. 11-13 demonstrate NOx estimation through the operation of additional models. FIG. 11 graphically illustrates training and validation data sets in operation of a trained neural network described by the following expression.

$$NOx=NNT(\mathrm{rail}P,Ta,CA50,EGR\ \%,phi) \quad (19)$$

FIG. 12 graphically illustrates validation of a model based upon terms described by the following expression.

$$NOx=f(Ta,RPM,\mathrm{fuel},intO2,\mathrm{rail}P) \quad (20)$$

wherein fuel describes the energy content of the fuel being combusted and intO2 describes readings from an oxygen sensor located in the intake manifold or an estimated oxygen concentration in the intake manifold. FIG. 13 graphically illustrates validation of a model based upon terms described by the following expression.

$$NOx=f(Ta,RPM,\mathrm{fuel},intO2,SOI) \quad (21)$$

wherein SOI describes the start of injection crank angle used in the combustion chamber. While exemplary embodiments of terms useful in describing the combustion process and resulting NOx creation have been described, it should be appreciated that a number of similar combinations are envisioned, and the disclosure is not intended to be limited to the particular embodiments described herein.

As mentioned above, a neural network as utilized by methods of the present disclosure reduce computational load upon a processor performing the calculations because the calculations and algorithms utilized by the neural network are based upon patterns in the data rather than actually modeling conditions within the combustion chamber as in known NOx creation estimation methods. An additional benefit of this data-based analysis method is that the neural network depends less upon actual sensor inputs than upon trends in the data. As a result, aging or deteriorating sensors, drifting from their factory settings, will have less impact upon a neural network which has better robustness against changes in the data than algorithms hard-programmed into the NOx creation estimating system.

Described in relation to known NOx estimation devices, such as the device described in FIG. 3, a system utilizing the methods described herein can be but need not be physically located entirely within a single device or performed within a single processor. Incorporating modern computational and communications capabilities, the entire system need not exist within a single vehicle, but might rather exist throughout a group of networked vehicles sharing information and learning from mass data collection. Alternatively or additionally, the system can include a central computer monitoring patterns of data and updating or continuously improving NOx estimations from the central location.

Figure 14:
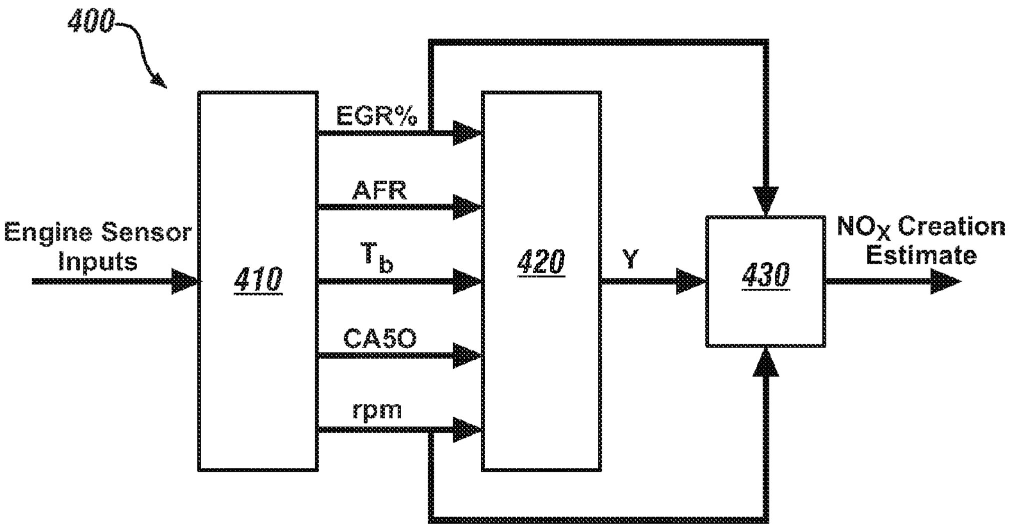
FIG. 14 schematically depicts an exemplary system generating a NOx creation estimate, utilizing a neural network to generate NOx creation estimates and including a dynamic model module to compensate NOx creation estimates for the effects of dynamic engine and vehicle conditions, in accordance with the present disclosure.

By methods described above, NOx creation estimates can be generated for a set of engine sensor inputs. As will be appreciated by one having ordinary skill in the art, equations and model predictions of engine operation frequently operate most effectively when the engine is operating at or near steady state. Likewise, a neural network estimating NOx creation based upon varying or transitory engine sensor inputs is likely to be less accurate than a neural network working with data generated by an engine at steady state. However, observations and predictions can be made regarding the effects of transient or dynamic engine operation upon NOx creation estimates or the accuracy thereof. An exemplary expression describing a dynamic model or dynamic filtering module is shown by the following equation.

$$\frac{dNOx}{dt} = f(NOx,\ y,\ EGR\ \%,\ AFR,\ Ta,\ RPM) \quad (22)$$

wherein contemporary NOx readings and an output y from a trained neural network are utilized to estimate a change in NOx creation. Such a change variable can be used to incrementally estimate NOx creation or can be used to check or filter NOx creation estimations. FIG. 14 schematically depicts an exemplary system generating a NOx creation estimate, utilizing models within a neural network to generate NOx creation estimates and including a dynamic model module to compensated NOx creation estimates for the effects of dynamic engine and vehicle conditions, in accordance with the present disclosure. NOx creation estimate system 400 comprises a model module 410, a neural network module 420, and a dynamic model module 430. Factors under current operating conditions most likely to impact NOx creation estimation under dynamic or changing conditions can be determined experimentally, empirically, predictively, through modeling or other techniques adequate to accurately predict engine operation. Inputs relating to these factors are fed to dynamic model module 430 along with output from neural network module 420, and the raw output from the neural network can be adjusted, filtered, averaged, de-prioritized or otherwise modified based upon the projected effects of the dynamic conditions determined by dynamic model module 430. In this way, the effects of dynamic engine or vehicle operation conditions can be accounted for in the estimation of NOx creation.

NOx creation estimates can be utilized in a wide variety of diagnostic and predictive functions within an aftertreatment system. For example, lean NOx traps can be regenerated based upon NOx estimates reaching a threshold level.

Improved accuracy of NOx creation estimates allows for greater certainty of device storage levels, allowing for less frequent regenerations and resulting improved fuel efficiency. NOx estimates allow for more accurate dosing of urea injection in an SCR, reducing excess injection and more frequent emptying of the urea storage tank based on uncertainty of NOx levels in the device. Additionally, fuel injection, air injection, diverter valve strategies, and engine or hybrid control strategies facilitating aftertreatment are all aftertreatment methods that can benefit from accurate real-time NOx creation estimation.

As described above, cylinder pressure readings can be used to model a mass fraction burn value for combustion within the combustion chamber, wherein the mass burn fraction value indexes a crank angle at which a selected percentage of injected fuel is burned in the combustion cycle. Further, a state of combustion within the combustion chamber based upon the mass fraction burn value can be estimated. The state of combustion can include a combustion phasing and a combustion strength. As will become apparent, NOx creation may be estimated within the combustion chamber with an exemplary non-linear function based upon said state of combustion. The exemplary non-linear function can be utilized instead of a neural network. The non-linear function can include a plurality of input parameters to accurately estimate NOx creation. Each of the plurality of input parameters are descriptive of said combustion process and based on engine sensor inputs, including the cylinder pressure within the combustion chamber. The non-linear function for estimating NOx creation can be expressed as follows.

$$NOx=f(x_1,x_2,x_3 \ldots ,x_n) \quad (23)$$

wherein each value of $x_1$-$x_n$ includes a respective one of the plurality of input parameters utilized to accurately estimate NOx creation.

It will be appreciated that the non-linear function can include any number of the plurality of input parameters $x_1$-$x_n$ for estimating NOx content. The plurality of inputs $x_1$-$x_n$, in addition to the state of combustion within the combustion chamber based upon the mass fraction burn value, can be derived from the engine sensor inputs including the cylinder pressure within the combustion chamber. An exemplary plurality of input parameters is illustrated with respect to the graphical depiction of FIG. 7 illustrating the exemplary modeled results describing standardized effects of a number of inputs (e.g., exemplary input parameters) to NOx emissions under a given set of conditions.

In an exemplary embodiment, the non-linear function of Eq. (23) includes a crank angle wherein a predetermined percentage of fractional pressure rise in said combustion chamber is achieved; a maximum pressure achieved within said combustion chamber, $P_{max}$; a crank angle wherein said maximum pressure is achieved, PPL; an air-fuel ratio, AFR; and a percentage of cylinder intake including exhaust gas recirculation flow, EGR %. It will be appreciated that the crank angle wherein the predetermined percentage of fractional pressure rise in said combustion chamber is achieved corresponds to the mass fraction burn value. In an exemplary embodiment, the mass fraction burn value is 50%, and may be represented as CA50. Further embodiments will refer the mass fraction burn value as CA50, however, the embodiments are not limited to the predetermined percentage of 50% and may include any desired percentage to be analyzed.

In another exemplary embodiment, the non-linear function of Eq. (23) includes an estimated temperature of burned charge within said combustion chamber, Tb; the CA50; the EGR %; the AFR and a fuel rail pressure, railP.

In another exemplary embodiment, the non-linear function of Eq. (23) includes an estimated temperature within said combustion chamber, Ta; the CA50; the EGR %; the AFR and the railP.

In yet another exemplary embodiment, the non-linear function of Eq. (23) includes the Ta; the CA50; an engine speed, RPM; a fuel energy content; an oxygen sensor measurement, intO2; and the railP.

In yet another exemplary embodiment, the non-linear function of Eq. (23) includes the Ta; the CA50; the RPM; the fuel energy content; the intO2; and a start of fuel injection crank angle, SOI.

Figure 15:
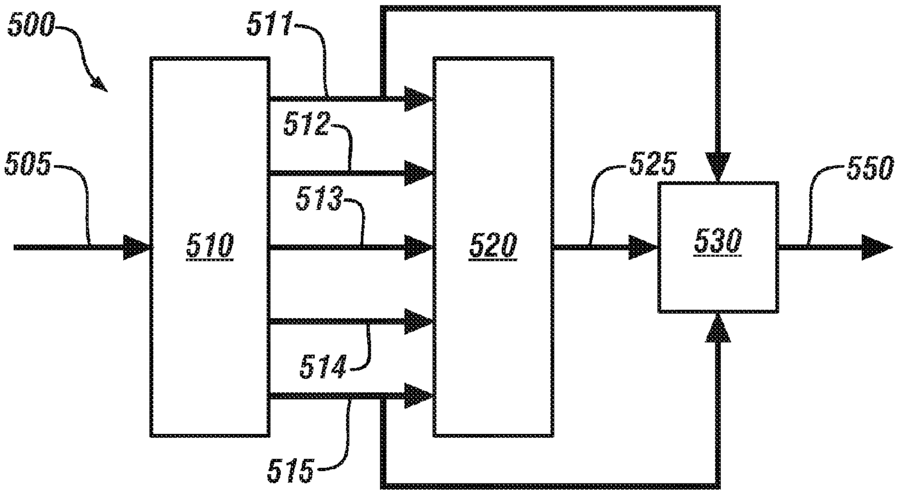
FIG. 15 schematically depicts an exemplary system generating a NOx creation estimate, utilizing a non-linear function to generate NOx creation estimates and including a dynamic model module to compensate NOx creation estimates for the effects of dynamic engine and vehicle conditions, in accordance with the present disclosure.

NOx creation estimates can be generated for a set of engine sensor inputs, including the pressure within the combustion chamber. Utilizing the exemplary non-linear function, observations and predictions can be made regarding the effects of transient or dynamic engine operation upon NOx creation estimates or the accuracy thereof. FIG. 15 illustrates an exemplary NOx creation estimate system 500 generating a dynamically adjusted NOx creation estimate 550, utilizing input parameters of the exemplary non-linear function and including a dynamic model module 530 to compensate NOx creation for the effects of dynamic engine and vehicle conditions, in accordance with the present disclosure. The NOx creation estimate system 500 can be but need not be physically located entirely within a single device or performed within a single processor or control system, e.g., the control system 25 of FIG. 2. Incorporating modern computational and communications capabilities, the engine system need not exist within a single vehicle, but might rather exist throughout a group of networked vehicles sharing information. Alternatively or additionally, the system can include a central computer monitoring patterns of data and updating or continuously improving NOx estimations from the central location.

The NOx creation estimate system 500 includes a model module 510, a non-linear function module 520 and the dynamic model module 530. An engine sensor input 505, including the pressure within the combustion chamber is input to the model module 510. The model module 510 generates the plurality of input parameters 511, 512, 513, 514 and 515 for input to the non-linear function module 520. It will be understood that the plurality of input parameters 511, 512, 513, 514 and 515 correspond to each of the input parameters $x_1$-$x_n$ of Eq. 23. The input parameters 511, 512, 513, 514 and 515 under current operating conditions most likely to impact NOx creation estimation under dynamic or changing conditions can be determined experimentally, empirically, predictively, through modeling or other techniques adequate to accurately predict engine operation. The non-linear function module 520 including the non-linear function generates an estimated NOx creation output 525. In one embodiment, the estimated NOx creation output 525 can be input to the dynamic model module 530 to adjust, filter, average, de-prioritize or otherwise modify the estimated NOx output 525 based upon projected effects of the dynamic conditions determined by the dynamic model module. In this way, the effects of dynamic engine or vehicle operation conditions can be accounted for in the estimation of NOx creation. Accordingly, the dynamic model module 530 outputs a dynamically adjusted estimated NOx output 550. It will be appreciated that the estimated NOx output 525 and the dynamically adjusted estimated NOx output 550 can be utilized in a wide variety of diagnostic and predictive functions within an aftertreatment system as discussed above.

Figure 16:
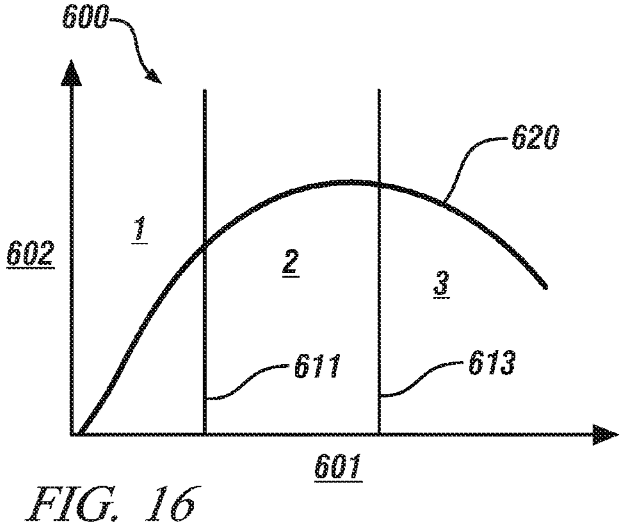
FIG. 16 illustrates an exemplary speed-torque plot 600 partitioned into three zones in accordance with the present disclosure.

FIG. 16 illustrates an exemplary speed-torque plot 600 in accordance with the present disclosure. The horizontal axis denotes engine speed in RPM 601 and the vertical axis denotes engine torque in Nm 602. It will be appreciated that the plot 600 is for exemplary purposes only to illustrate an exemplary speed-torque profile 620. In an exemplary embodiment, the speed-torque profile 620 can be partitioned into a plurality of zones. For instance, vertical partition lines 611 and 613 partition the speed-torque profile 620 into first, second and third zones 1, 2, 3, respectively. It will be appreciated that while vertical partition lines 611 and 613 are depicted with respect to engine speed 601, horizontal partition lines can be additionally or alternatively included with respect to engine torque 602. It will be further appreciated that while three zones 1-3 are depicted, the speed-torque profile 620 can be partitioned into any desired number of zones.

In an exemplary embodiment, NOx creation can be estimated within the combustion chamber with the non-linear function based upon said state of combustion for each partitioned zone 1-3. It will be appreciated that input parameters effect the estimation of NOx differently depending on the speed-torque profile 620 of the combustion chamber. Thus, Eq. 23 can be utilized for each partitioned zone including a different set of selected input parameters respective to each zone. Thus, NOx creation can be estimated for each respective zone 1-3 to achieve the greatest accuracy in estimating NOx creation.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for estimating NOx creation in a combustion process of a four-stroke internal combustion engine including a variable volume combustion chamber defined by a piston reciprocating within a cylinder between top-dead center and bottom-dead center points, intake and exhaust passages, and intake and exhaust valves controlled during repetitive, sequential exhaust, intake, compression and expansion strokes of said piston, comprising:

monitoring engine sensor inputs comprising a cylinder pressure within the combustion chamber;

modeling a mass fraction burn value for combustion within the combustion chamber based upon said engine sensor inputs, wherein said mass fraction burn value indexes a crank angle at which a selected percentage of injected fuel is burned in a combustion cycle;

estimating a state of combustion within the combustion chamber based upon the mass fraction burn value, the state of combustion comprising a combustion phasing and a combustion strength; and estimating NOx creation within the combustion chamber with a non-linear function based upon said state of combustion.

2. The method of claim 1 wherein estimating NOx creation within the combustion chamber with the non-linear function based upon said state of combustion comprises:

partitioning a speed-torque profile for the engine into a plurality of zones; and estimating NOx creation within the combustion chamber with the non-linear function based upon said state of combustion for each partitioned zone.

3. The method of claim 1 wherein the non-linear function includes a plurality of input parameters comprising:

a crank angle wherein a predetermined percentage of a fractional pressure rise in said combustion chamber is achieved;

a maximum pressure achieved within said combustion chamber;

a crank angle wherein said maximum pressure is achieved;

an air-fuel ratio; and a percentage of cylinder intake comprising exhaust gas recirculation flow.

4. The method of claim 1 wherein the non-linear function includes a plurality of input parameters comprising:

an estimated temperature of burned charge within said cylinder;

a crank angle wherein a predetermined percentage of a fractional pressure rise in said combustion chamber is achieved;

a percentage of intake comprising exhaust gas recirculation flow;

an air-fuel ratio; and a fuel rail pressure.

5. The method of claim 1 wherein the non-linear function includes a plurality of input parameters comprising:

an estimated average temperature within said combustion chamber;

a crank angle wherein a predetermined percentage of a fractional pressure rise in said combustion chamber is achieved;

a percentage of intake comprising exhaust gas recirculation flow;

an air-fuel ratio; and a fuel rail pressure.

6. The method of claim 1 wherein the non-linear function includes a plurality of input parameters comprising at least one of:

an estimated average temperature within said combustion chamber;

a crank angle wherein a predetermined percentage of a fractional pressure rise in said combustion chamber is achieved;

an engine speed;

a fuel energy content;

an oxygen sensor measurement; and a fuel rail pressure.

7. The method of claim 1 wherein the non-linear function includes a plurality of input parameters comprising at least one of:

an estimated average temperature within said combustion chamber;

a crank angle wherein a predetermined percentage of a fractional pressure rise in said combustion chamber is achieved;

an engine speed;

a fuel energy content;

an oxygen sensor measurement; and a start of fuel injection crank angle.

8. The method of claim 1, further comprising controlling aftertreatment devices based upon said estimated NOx creation.

9. The method of claim 1, wherein modeling said mass fraction burn value comprises calculating a total heat released for a given crank angle based upon said cylinder pressure.

10. The method of claim 1, wherein modeling said mass fraction burn value includes analyzing said cylinder pressure through spectral analysis comprising a Fast Fourier Transform.

11. The method of claim 1, further comprising modifying a result of said estimated NOx creation based upon a dynamic engine factor.

12. The method of claim 11, wherein said dynamic engine factor comprises a filter discriminating NOx estimates generated during transitory engine operation.

13. The method of claim 11, wherein said dynamic engine factor comprises a NOx creation rate estimate utilized to estimate effects of transitory engine operation.

14. Apparatus for estimating NOx creation in a combustion process of a four-stroke internal combustion engine including a variable volume combustion chamber defined by a piston reciprocating within a cylinder between top-dead center and bottom-dead center points, intake and exhaust passages, and intake and exhaust valves controlled during repetitive, sequential exhaust, intake, compression and expansion strokes of said piston, said apparatus comprising:

a pressure sensor generating pressure sensor readings representing conditions within said combustion chamber;

a NOx estimation module including logic operations comprising:

monitoring said pressure sensor readings;

modeling a mass fraction burn value for combustion within the combustion chamber based upon said pressure sensor readings, wherein said mass fraction burn value indexes a crank angle at which a selected percentage of injected fuel is burned in a combustion cycle;

estimating a state of combustion within the combustion chamber based upon the mass fraction burn value, the state of combustion comprising a combustion phasing and a combustion strength; and estimating NOx creation with a non-linear function based upon said state of combustion; and an aftertreatment system receiving an exhaust gas flow from said engine and modulating aftertreatment based upon said NOx creation estimate.

15. The apparatus of claim 14, wherein said logic operations further comprise a dynamic engine filter modulating NOx estimates based upon transient operation of said engine.

16. The apparatus of claim 14, wherein said aftertreatment system comprises a lean NOx trap, and wherein modulating aftertreatment comprises scheduling regeneration events.

17. The apparatus of claim 14, wherein said aftertreatment system comprises a selective catalytic reduction device, and wherein modulating aftertreatment comprises dosing urea injection based upon said NOx creation estimation.

18. The apparatus of claim 14, further comprising:

monitoring an average temperature within said combustion chamber; and wherein estimating said NOx creation is further based upon said average temperature.

19. The apparatus of claim 18, wherein monitoring said average temperature comprises:

monitoring a maximum pressure achieved within said combustion chamber;

monitoring a volume of the cylinder at an instant said maximum pressure is achieved;

monitoring a charge flow into said cylinder; and determining said average temperature based upon said maximum pressure, said volume, and said charge flow.

* * * * *